US009689354B1

(12) United States Patent
Beresford-Knox et al.

(10) Patent No.: US 9,689,354 B1
(45) Date of Patent: Jun. 27, 2017

(54) ENGINE EXHAUST GAS RECIRCULATION SYSTEM WITH AT LEAST ONE EXHAUST RECIRCULATION TREATMENT DEVICE

(71) Applicant: Ford Global Technologies, LLC, Dearborn, MI (US)

(72) Inventors: Chris Beresford-Knox, Hauxton (GB); Anthony Birri, Southgate (GB); Iain Murray, Hockley (GB); Mark Stephen Brogan, Duxford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/398,596

(22) Filed: Jan. 4, 2017

(30) Foreign Application Priority Data

Jan. 19, 2016 (GB) .................................. 1600934.2

(51) Int. Cl.
*F02M 26/35* (2016.01)
*F02M 26/08* (2016.01)
(Continued)

(52) U.S. Cl.
CPC ........... *F02M 26/35* (2016.02); *B01D 53/944* (2013.01); *B01D 53/9431* (2013.01); *B01J 23/40* (2013.01); *B01J 29/06* (2013.01); *F02D 41/0077* (2013.01); *F02D 41/0245* (2013.01); *F02M 26/08* (2016.02); *F02M 26/22* (2016.02)

(58) Field of Classification Search
CPC .... F01N 2340/06; F02M 26/08; F02M 26/09; F02M 26/13; F02M 26/14; F02M 26/15; F02M 26/16; F02M 26/21; F02M 26/22; F02M 26/23; F02M 26/27; F02M 26/28; F02M 26/35; F02M 26/36; F02M 26/38;
(Continued)

(56) References Cited

U.S. PATENT DOCUMENTS 5,908,480 A 6/1999 Ban et al.
6,062,026 A * 5/2000 Woollenweber ........ F02B 37/04
60/605.2
(Continued)

FOREIGN PATENT DOCUMENTS

CN 101298057 A 11/2008
DE 102009022938 A1 * 6/2010 ............. F01N 3/106
(Continued)

OTHER PUBLICATIONS

Examination Report for Great Britain Patent Application No. 1600934.2, Apr. 14, 2016, United Kingdom Intellectual Property Office, 9 pages.

*Primary Examiner* — Mark Laurenzi
*Assistant Examiner* — Mickey France
(74) *Attorney, Agent, or Firm* — Julia Voutyras; McCoy Russell LLP

(57) ABSTRACT

An exhaust gas recirculation system for an engine is provided. The system comprises an exhaust duct configured to receive and exhaust gases from the engine; an exhaust gas recirculation duct configured to recirculate a portion of the exhaust gases within the exhaust duct to the intake of the engine; and at least one recirculation treatment device provided in the exhaust gas recirculation duct, wherein the recirculation treatment device comprises a catalyst configured to encourage removal of contaminants from the recirculated exhaust gases.

20 Claims, 4 Drawing Sheets

(51) Int. Cl.
    *F02M 26/22*   (2016.01)
    *B01D 53/94*   (2006.01)
    *F02D 41/02*   (2006.01)
    *F02D 41/00*   (2006.01)
    *B01J 23/40*   (2006.01)
    *B01J 29/06*   (2006.01)

(58) Field of Classification Search
    CPC .............. F02M 26/39; F02M 26/42; F02B 37/00–37/10; F02B 37/013
    USPC ...... 60/598–605.2, 609, 612, 280, 286, 287; 123/568.11, 568.12, 568.17, 568.18
    See application file for complete search history.

(56) References Cited

U.S. PATENT DOCUMENTS

| | | | | |
|---|---|---|---|---|
| 6,352,068 | B1* | 3/2002 | Jacobsen | F01N 1/14 123/585 |
| 6,988,365 | B2* | 1/2006 | Sasaki | F01N 3/0821 123/568.21 |
| 7,107,764 | B1* | 9/2006 | Opris | F01N 3/023 60/274 |
| 7,278,411 | B1* | 10/2007 | Fluga | F02D 41/0072 123/568.12 |
| 7,299,793 | B1 | 11/2007 | Tyo et al. | |
| 7,465,337 | B2* | 12/2008 | Gaertner | F02M 25/12 123/198 E |
| 7,513,108 | B2* | 4/2009 | Tomlins | F01N 3/023 60/274 |
| 7,878,162 | B2* | 2/2011 | McClure | F01L 1/34 123/323 |
| 8,387,370 | B2* | 3/2013 | Van Nieuwstadt | F02D 41/0055 60/278 |
| 8,596,252 | B2* | 12/2013 | Liu | F02B 29/0412 123/568.12 |
| 8,793,997 | B2* | 8/2014 | Beil | F01N 3/103 123/562 |
| 8,833,059 | B2* | 9/2014 | Keppeler | F01N 3/2066 60/280 |
| 9,157,356 | B2* | 10/2015 | Balthes | F01N 3/023 |
| 9,458,799 | B2* | 10/2016 | Balthes | F01N 3/0231 |
| 2005/0103014 | A1* | 5/2005 | Sasaki | F01N 3/0821 60/605.2 |
| 2006/0266019 | A1* | 11/2006 | Ricart-Ugaz | F01N 3/0231 60/278 |
| 2006/0288692 | A1* | 12/2006 | Opris | F01N 3/023 60/295 |
| 2007/0068141 | A1* | 3/2007 | Opris | F01M 13/04 60/283 |
| 2007/0235010 | A1* | 10/2007 | Fluga | F02D 41/0072 123/568.12 |
| 2007/0277510 | A1* | 12/2007 | McClure | F01L 1/34 60/295 |
| 2008/0000228 | A1* | 1/2008 | Kieser | F02B 29/0412 60/605.1 |
| 2008/0060348 | A1* | 3/2008 | Robel | B01D 53/9431 60/295 |
| 2008/0078170 | A1* | 4/2008 | Gehrke | F01N 3/0256 60/295 |
| 2008/0155972 | A1* | 7/2008 | Driscoll | F01N 3/023 60/299 |
| 2008/0202101 | A1* | 8/2008 | Driscoll | F01N 3/035 60/286 |
| 2008/0295501 | A1* | 12/2008 | Gong | F02M 25/12 60/299 |
| 2010/0300088 | A1* | 12/2010 | Joergl | F02B 37/164 60/602 |
| 2011/0072804 | A1* | 3/2011 | Van Nieuwstadt | F02D 41/0055 60/287 |
| 2011/0100343 | A1* | 5/2011 | Liu | F02B 29/0412 123/568.12 |
| 2012/0180479 | A1* | 7/2012 | Beil | F01N 3/106 60/605.2 |
| 2013/0269327 | A1* | 10/2013 | Keppeler | F01N 3/2066 60/301 |
| 2014/0041367 | A1* | 2/2014 | Balthes | F01N 3/035 60/274 |
| 2014/0109554 | A1* | 4/2014 | Balthes | F01N 3/023 60/274 |
| 2014/0260243 | A1* | 9/2014 | Zhang | F02M 25/0709 60/605.2 |
| 2014/0318105 | A1* | 10/2014 | Keppeler | F02D 41/029 60/274 |
| 2015/0052891 | A1* | 2/2015 | Uehane | F02B 37/16 60/605.2 |
| 2015/0316004 | A1* | 11/2015 | Balthes | F01N 3/0231 60/274 |
| 2016/0084203 | A1* | 3/2016 | Fukui | F02B 37/16 60/278 |
| 2017/0037817 | A1* | 2/2017 | Jayakar | F02M 35/10295 |

FOREIGN PATENT DOCUMENTS

| | | |
|---|---|---|
| DE | 202015104462 U1 | 10/2015 |
| EP | 1065352 A2 | 1/2001 |
| EP | 1209330 A1 | 5/2002 |
| EP | 1231663 A1 | 8/2002 |
| EP | 2685080 A1 | 1/2014 |
| EP | 2525721 A | 11/2015 |
| EP | 2957757 A1 | 12/2015 |
| FR | WO 2011151560 A1 * 12/2011 ............. F02M 25/12 |
| WO | 2011064655 A2 | 6/2011 |

\* cited by examiner

ENGINE EXHAUST GAS RECIRCULATION SYSTEM WITH AT LEAST ONE EXHAUST RECIRCULATION TREATMENT DEVICE

CROSS REFERENCE TO RELATED APPLICATION

The present application claims priority to Great Britain Patent Application No. 1600934.2, filed on Jan. 19, 2016. The entire contents of the above-referenced application are hereby incorporated by reference in its entirety for all purposes.

FIELD

The present disclosure relates to an engine assembly comprising a recirculation treatment device and is particularly, although not exclusively, concerned with an engine assembly comprising a recirculation treatment device configured to provide improved emissions control.

BACKGROUND/SUMMARY

A high proportion of vehicle engines are fitted with turbochargers to improve performance as well as fuel efficiency and emissions levels. Engines which are fitted with turbochargers often incorporate an Exhaust Gas Recirculation (EGR) system, which further reduces emissions values by recirculating a portion of the exhaust gases back to the inlet of the engine. In a low pressure EGR system the EGR gases are reintroduced upstream of the turbocharger compressor inlet. The pressure at this location is low, even in high engine boost conditions, which allows for the low pressure recirculation of the exhaust gases. In contrast, in a high pressure EGR system the EGR gases are reintroduced downstream of the turbocharger compressor outlet and hence exhaust gases must be recirculated at a higher pressure. Some vehicles are fitted with twin turbo chargers, which work in series to increase the pressure of inlet gases and recirculated exhaust gases. High pressure EGR gases may be reintroduced upstream or downstream of the second compressor.

Vehicles also often include one or more exhaust after treatment devices which are provided in the exhaust pipe and are configured to remove polluting substances from the exhaust gases before they are emitted or capture them within the device. Exhaust after-treatment devices are often heated by the exhaust gases to a temperature at which capture and/or removal of the polluting substances can proceed effectively.

As the efficiency of modern engines has increased, the temperature of exhaust gases leaving the engine has typically been reduced. This can lead to exhaust after-treatment devices not being heated to desirable temperatures and result in an increase in vehicle emissions.

According to an aspect of the present disclosure, there is provided an exhaust gas recirculation system for an engine, the system comprising: an exhaust duct configured to receive exhaust gases from the engine; an exhaust gas recirculation duct configured to recirculate a portion of the exhaust gases within the exhaust duct to the intake of the engine, wherein the exhaust gas recirculation duct comprises an inter-compressor duct configured to carry inlet and exhaust gases between first and second turbocharger compressors associated with the engine; and at least one recirculation treatment device provided in the inter-compressor duct, wherein the recirculation treatment device comprises a catalyst configured to encourage removal of contaminants from the recirculated exhaust gases.

The catalyst may be configured to catalyze a reduction and/or oxidation reaction of the recirculated exhaust gases. Additionally or alternatively, the catalyst may be configured to capture a substance from the recirculated exhaust gases. For example, the catalyst may comprise a zeolite material. The catalyst may be configured to capture water vapor and/or liquid from the recirculated exhaust gases.

The recirculation treatment device may comprise a substrate. The catalyst may be provided on the substrate. The substrate may be a metallic substrate. Alternatively, the substrate may be a ceramic substrate, such as a silicon carbide, cordierite, aluminium titanate and/or mullite substrate. The catalyst may comprise a platinum group metal catalyst.

The system may further comprise a cooler configured to cool exhaust gases within the exhaust gas recirculation duct. At least one of the recirculation treatment devices may be provided upstream of the cooler. Additionally or alternatively, at least one of the recirculation treatment devices may be provided downstream of the cooler.

The recirculation treatment device may comprise a diesel oxidation catalyst. Additionally or alternatively, the recirculation treatment device may comprise a lean NOx trap. Again additionally or alternatively, the recirculation treatment device may comprise a selective catalytic reduction device.

The recirculation treatment device may comprise a reformer catalyst configured to generate hydrogen within the exhaust gases.

The exhaust gas recirculation duct may comprise a low pressure exhaust gas recirculation duct, which branches from an exhaust pipe of the engine downstream of a turbocharger turbine associated with the engine. The exhaust gas recirculation duct may be configured to recirculate exhaust gases to a point upstream of a turbocharger compressor associated with the engine. The turbine and the compressor may be operatively coupled, e.g. as part of a turbocharger of the engine.

The exhaust gas recirculation duct may comprise a high pressure exhaust gas recirculation duct, which branches from an exhaust pipe of the engine upstream of a turbocharger turbine associated with the engine. The exhaust gas recirculation duct may be configured to recirculate exhaust gases to a point downstream of a turbocharger compressor associated with the engine.

An engine system may comprise the above-mentioned exhaust gas recirculation system.

A vehicle may comprise the above-mentioned engine or the above-mentioned exhaust gas recirculation system.

According to another aspect of the present disclosure, there is provided a method of operating exhaust gas recirculation system, the system comprising: an exhaust duct configured to receive exhaust gases from the engine; an exhaust gas recirculation duct configured to recirculate a portion of the exhaust gases within the exhaust duct to the intake of the engine, the exhaust gas recirculation duct comprising an inter-compressor duct configured to carry inlet and exhaust gases between first and second turbocharger compressors associated with the engine; and at least one recirculation treatment device provided in the inter-compressor duct, wherein the recirculation treatment device comprises a catalyst configured to encourage removal of contaminants from the recirculated exhaust gases; wherein the method comprises: catalyzing reactions of the exhaust gases within the exhaust gas recirculation duct.

The method may further comprise operating the engine under rich and/or hot combustion conditions.

The system may further comprise a valve configured to control the flow of exhaust gases through the exhaust gas recirculation duct. The method may further comprise controlling the valve to allow a flow of exhaust gases through the duct.

The method may further comprise determining whether one or more of the recirculation treatment devices require regenerating. The engine may only be operated under rich and/or hot combustion conditions, and/or the valve may only be controlled to allow a flow of exhaust gases through the exhaust gas recirculation duct if one or more of the recirculation devices required regenerating.

The system may further comprise an exhaust after-treatment module provided in the exhaust duct. The exhaust after-treatment module may be configured to remove pollutant substances from the exhaust gases, e.g. before and/or after the exhaust gases have been recirculated. The method may further comprise determining whether the exhaust after-treatment module requires regenerating. The engine may only be operated under rich and/or hot combustion conditions if the exhaust after-treatment module requires regenerating. Operating the engine under rich and/or hot combustion conditions may be delayed until the exhaust after-treatment module requires regenerating.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
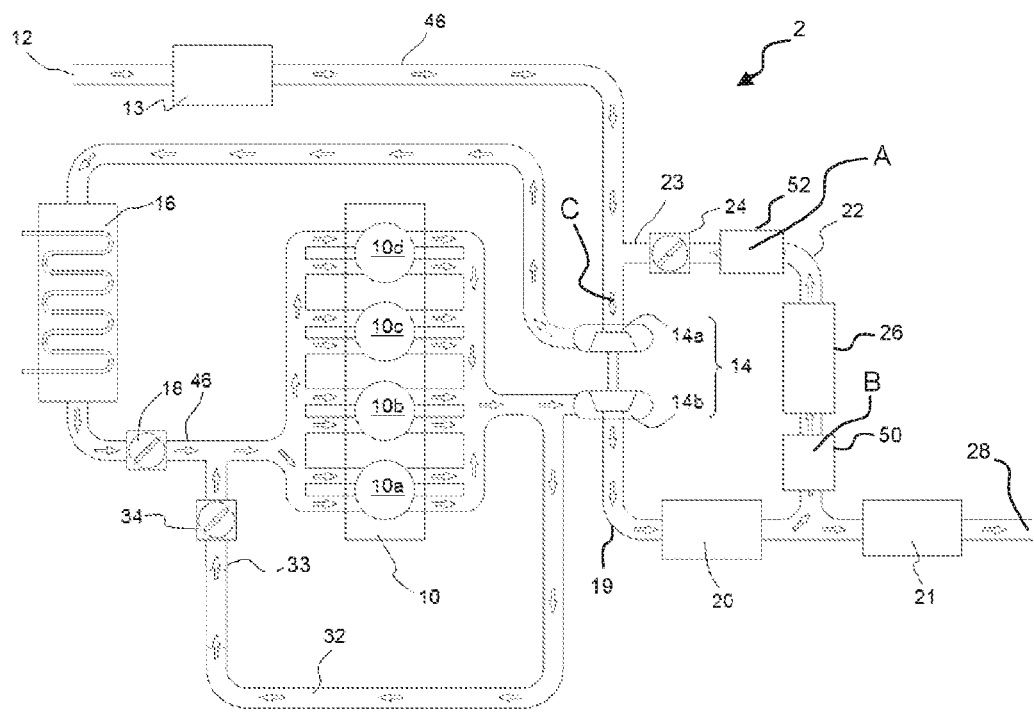
FIG. 1 is a schematic view of the air and exhaust paths in an engine with an EGR system according to an arrangement of the present disclosure.
Figure 2:
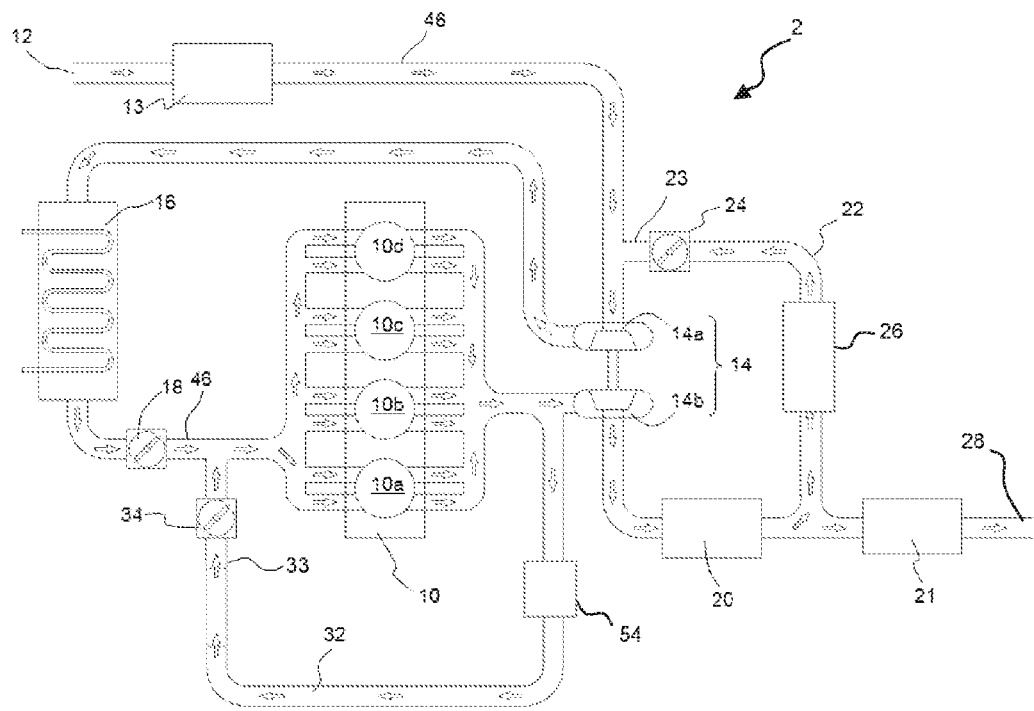
FIG. 2 is a schematic view of the air and exhaust paths in an engine with an EGR system according to another arrangement of the present disclosure.

With reference to FIGS. 1 and 2, an engine assembly 2 for an internal combustion engine 10 of a motor vehicle according to arrangements of the present disclosure is described. Air may enter an air inlet duct 46 through an inlet 12 and then pass through an air filter 13. The air may then pass through a compressor 14a of a turbocharger 14. The turbocharger 14 may improve the engine power output and reduce emissions. Typically, the turbocharger 14 is arranged with an exhaust gas driven turbine 14b driving the compressor 14a mounted on the same shaft. A charge air cooler 16 may be provided downstream of the turbocharger compressor 14a. The charge air cooler 16 may further increase the density of the air entering the internal combustion engine 10, thereby improving its performance. The air may then enter the internal combustion engine 10 via a throttle 18 configured to vary the mass flow of air into the internal combustion engine.

In a particular example of the present disclosure, the internal combustion engine 10 comprises a diesel engine, however, it is equally envisaged that the engine 10 may be a spark ignition engine. As is depicted in FIG. 1, the internal combustion engine 10 may comprise a number of cylinders 10a-d and the air may flow into each of these cylinders at an appropriate time in the engine's cycle as determined by one or more valves (not shown).

The exhaust gases leaving the internal combustion engine 10 may enter an exhaust duct 19 configured to receive exhaust gases from the engine and exhaust them via an exhaust outlet 28. Exhaust gases within the exhaust duct 19 may pass through the turbine 14b of the turbocharger. One or more exhaust treatment modules 20 may be provided downstream of the turbine 14b, e.g. to reduce emissions from the engine exhaust. The exhaust treatment modules 20 may comprise one or more of an oxidation catalyst, e.g. a diesel oxidation catalyst, and a particulate filter, e.g. a diesel particulate filter. A further exhaust treatment module 21 may be provided, e.g. downstream of the exhaust treatment module 20.

A first exhaust gas recirculation loop 22 configured to selectively recirculate exhaust gases from the internal combustion engine 10 back into the internal combustion engine may also be provided. The first exhaust gas recirculation loop 22 may be provided about the turbocharger 14 such that exhaust gases leaving the turbine 14b may be recirculated into the inlet of compressor 14a. The first exhaust gas recirculation loop 22 may comprise a first exhaust gas recirculation duct 23, which may branch from the main exhaust flow path, e.g. exhaust gases may be diverted from the main exhaust flow path to flow through the first exhaust gas recirculation duct 23. The first exhaust gas recirculation duct 23 may branch from the main exhaust flow path downstream of the exhaust treatment module 20 (and upstream of the further exhaust treatment module 21 if provided). The first exhaust gas recirculation loop 22 may further comprise a first recirculation valve 24, which may control the amount of recirculation through the first exhaust gas recirculation duct 23. In addition, an exhaust gas cooler 26 may be provided in the exhaust gas recirculation loop 22 to cool gases within the first exhaust gas recirculation loop 22. The exhaust gas cooler 26 may be cooled by virtue of fluid, e.g. water, flowing through a coolant passage, which may be part of a coolant circuit (not shown) of the engine 10.

A second EGR loop 32 configured to selectively recirculate exhaust gases from the internal combustion engine 10 back into the internal combustion engine may also be provided. The second EGR loop 32 may be provided about the engine 10 with exhaust gases leaving the engine 10 being recirculated to the air inlet of the engine 10. The second exhaust gas recirculation loop 32 may comprise a second exhaust gas recirculation duct 33, which may branch from the main exhaust flow path, e.g. gases may be diverted from the main exhaust flow path to flow through the second exhaust gas recirculation duct 33. The second exhaust gas recirculation duct 33 may branch from the main exhaust flow path at a point between the engine 10 and the turbine 14b of the turbocharger. Accordingly, the exhaust gases in the second EGR loop 32 may be at a higher pressure than the exhaust gases in the first EGR loop 22. The second exhaust gas recirculation loop 32 may comprise a second recirculation valve 34 which may control the amount of recirculation in the second EGR loop 32.

With reference to FIG. 1, the first EGR loop 22 may comprise a first recirculation treatment device 50. The first recirculation treatment device 50 may be provided within the first exhaust gas recirculation duct 23. The first recirculation treatment device 50 may be provided at a location A upstream of the exhaust gas cooler 26. The first EGR loop 22 may further comprise a second recirculation treatment device 52. As shown in FIG. 1, the second recirculation treatment device 52 may be provided at a location B downstream of the exhaust gas cooler 26.

Although in the arrangement shown in FIG. 1 the first EGR loop 22 comprises the first recirculation treatment device 50 and the second recirculation treatment device 52, it is also envisaged that either of the exhaust treatments devices may be omitted. Additionally or alternatively, one of the first or second recirculation treatment devices or another recirculation treatment device (not shown) may be provided at location C. Location C may be on the air inlet duct 46 at a position downstream of the outlet of the first EGR duct 23. Furthermore, although the second EGR loop 32 is shown in FIG. 1, this may be omitted.

With reference to FIG. 2, according to a second arrangement of the present disclosure, the second EGR loop 32 may comprise a third recirculation treatment device 54. The third recirculation treatment device 56 may be provided within the second exhaust gas recirculation duct 33. Although in the arrangement shown in FIG. 2 the first EGR loop 22 does not comprise the first recirculation treatment device 50 or the second recirculation treatment device 52, it is also envisaged that either or both of the first or second exhaust treatments devices may be provided in the arrangement shown in FIG. 2. Furthermore, the first EGR loop 22 may be omitted.

Figure 3:
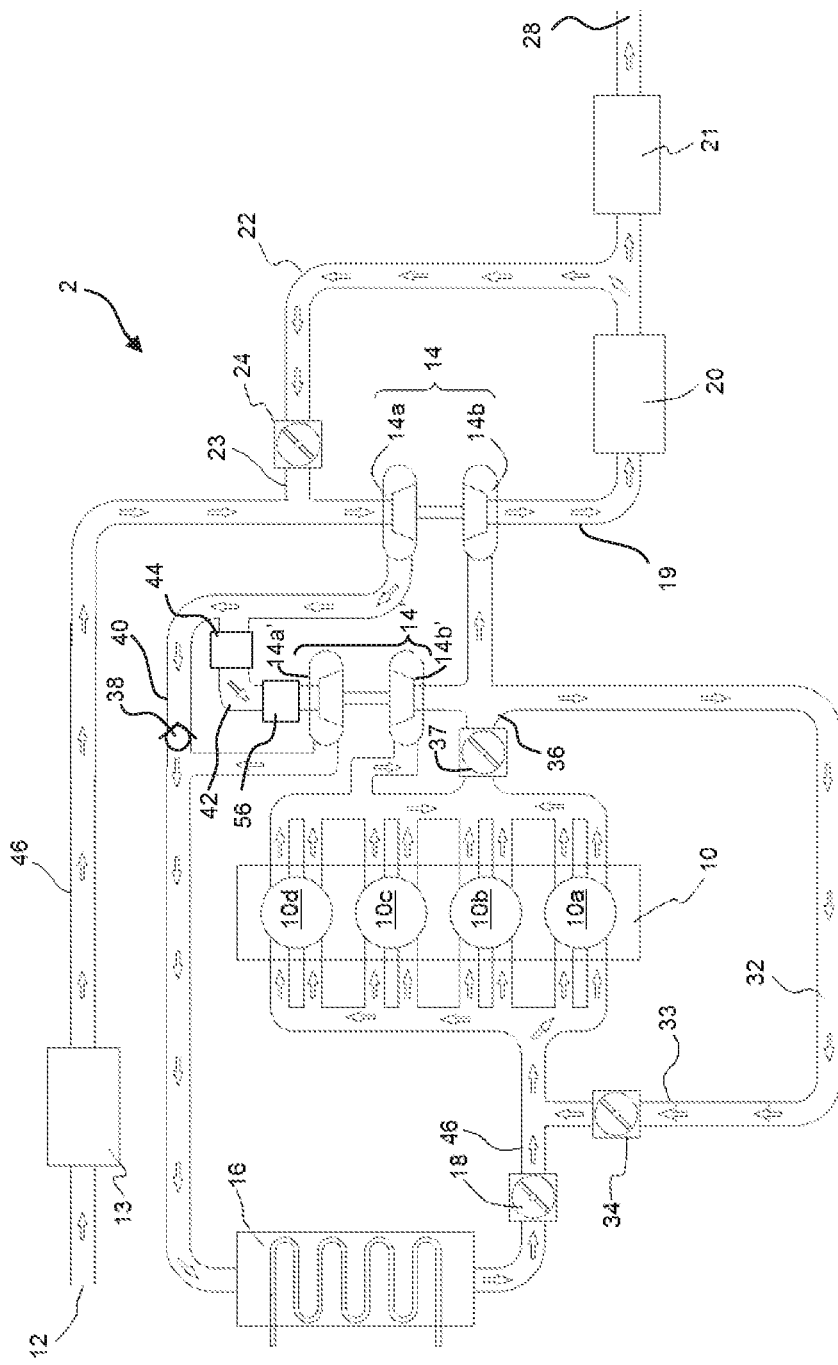
FIG. 3 is a schematic view of the air and exhaust paths in an engine with an EGR system according to another arrangement of the present disclosure.

With reference to FIG. 3, according to a third arrangement of the present disclosure, the engine assembly may further comprise a second turbocharger 14'. The second turbocharger 14' may be a High Pressure (HP) turbocharger comprising an HP compressor 14a' driven by an HP turbine 14b' mounted on the same shaft as the HP compressor 14a'.

As depicted in FIG. 3, the HP turbine 14b' may be provided upstream of the turbine 14b, such that exhaust gases passing through the HP turbine 14b' may subsequently pass through the turbine 14b. Alternatively, exhaust gases may flow directly from the engine 10 to the turbine 14b, e.g. bypassing the HP turbine 14b', by flowing through an HP turbine bypass duct 36. An HP bypass valve 37 may be provided to control the amount of exhaust gases bypassing the HP turbine 14b'.

The HP compressor 14a' may be configured to receive inlet gases, which have been compressed by the compressor 14a. An inter-compressor duct 42 may be provided to carry inlet gases between the compressor 14a and the HP compressor 14a'. An HP compressor bypass duct 40 may also be provided, which allows inlet gases leaving the compressor 14a to bypass the HP compressor 14a', e.g. if the HP compressor is not operating. A check valve 38 may control the flow of inlet gases though the HP compressor bypass duct 40.

An intercooler 44 may be provided on the inter-compressor duct 42. The intercooler may be configured to reduce the temperature of inlet gases entering the HP compressor 14a', in order to improve the efficiency of the HP compressor.

With reference to FIG. 3, the engine assembly 2 may further comprise a fourth recirculation treatment device 56, which may be provided within the inter-compressor duct 42. As described above with reference to FIGS. 1 and 2, the engine system 2 may comprise the first EGR loop 22, which is configured to recirculate a portion of the exhaust gases to the inlet of the compressor 14a. Hence, recirculated exhaust gases may pass through the recirculation treatment device 56 before passing into the HP compressor 14a'. Although the second EGR loop 32 is shown in FIG. 3, this may be omitted.

As depicted in FIG. 3, the fourth recirculation treatment device 56 may be provided downstream of the intercooler 44. Alternatively the fourth recirculation treatment device 56 may be provided upstream of the intercooler 44, e.g. the positions of the intercooler 44 and the fourth recirculation treatment device 56 may be interchanged.

Although in FIG. 3, the engine assembly 2 does not comprise the first, second or third recirculation treatment devices 50, 52, 54. It is also envisaged that any of the first, second and/or third recirculation treatment devices 50, 52, 54 may be provided within the engine assembly 2 depicted in FIG. 3. The first, second and/or third recirculation treatment devices 50, 52, 54 may be included in any combination together with the fourth recirculation treatment device 56.

In each of the arrangements described above with reference to FIGS. 1 to 3, the recirculation treatment device or devices 50, 52, 54, 56 are arranged such that at least a portion of the gases flowing through the recirculation treatment devices is recirculated exhaust gases.

Figure 4A:
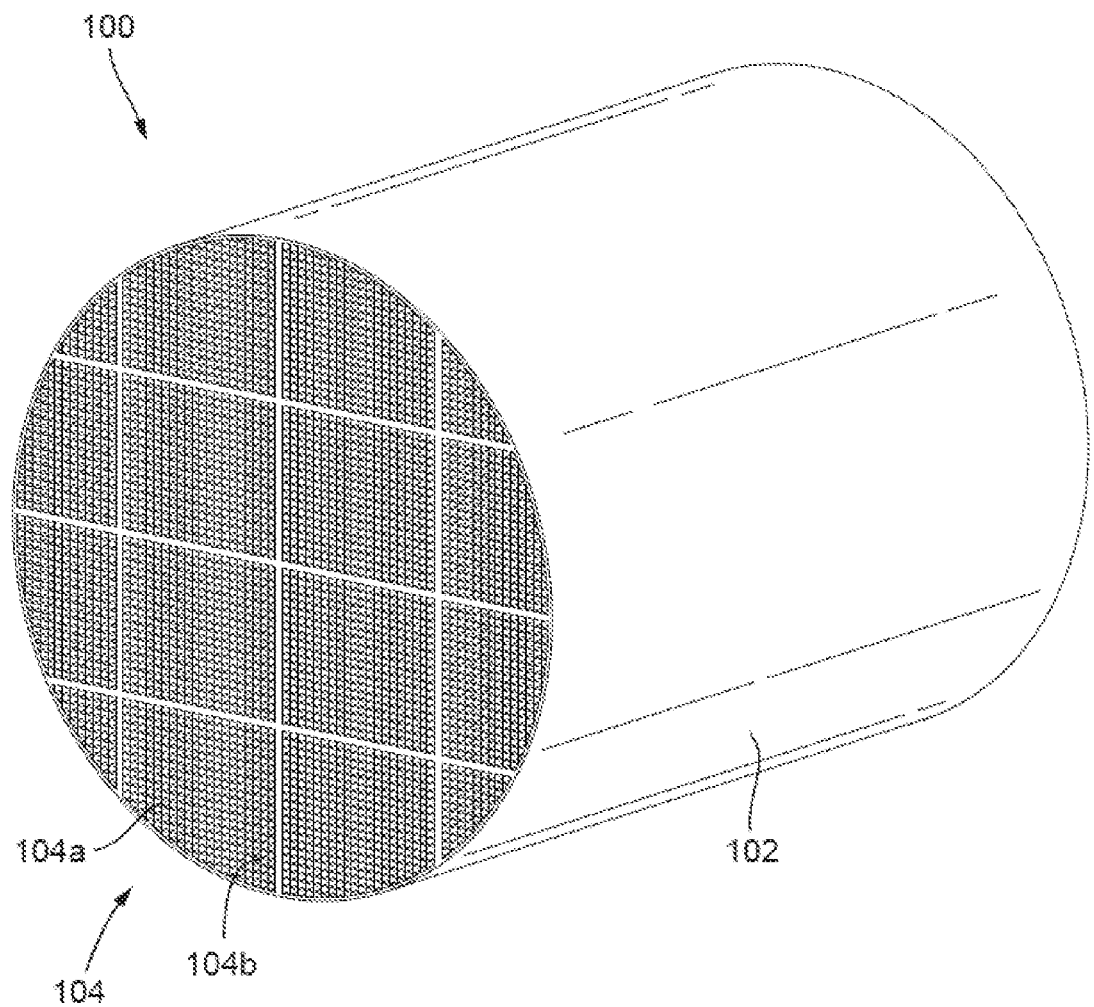
FIG. 4A is a perspective view of a recirculation treatment device according to an arrangement of the present disclosure.
Figure 4B:
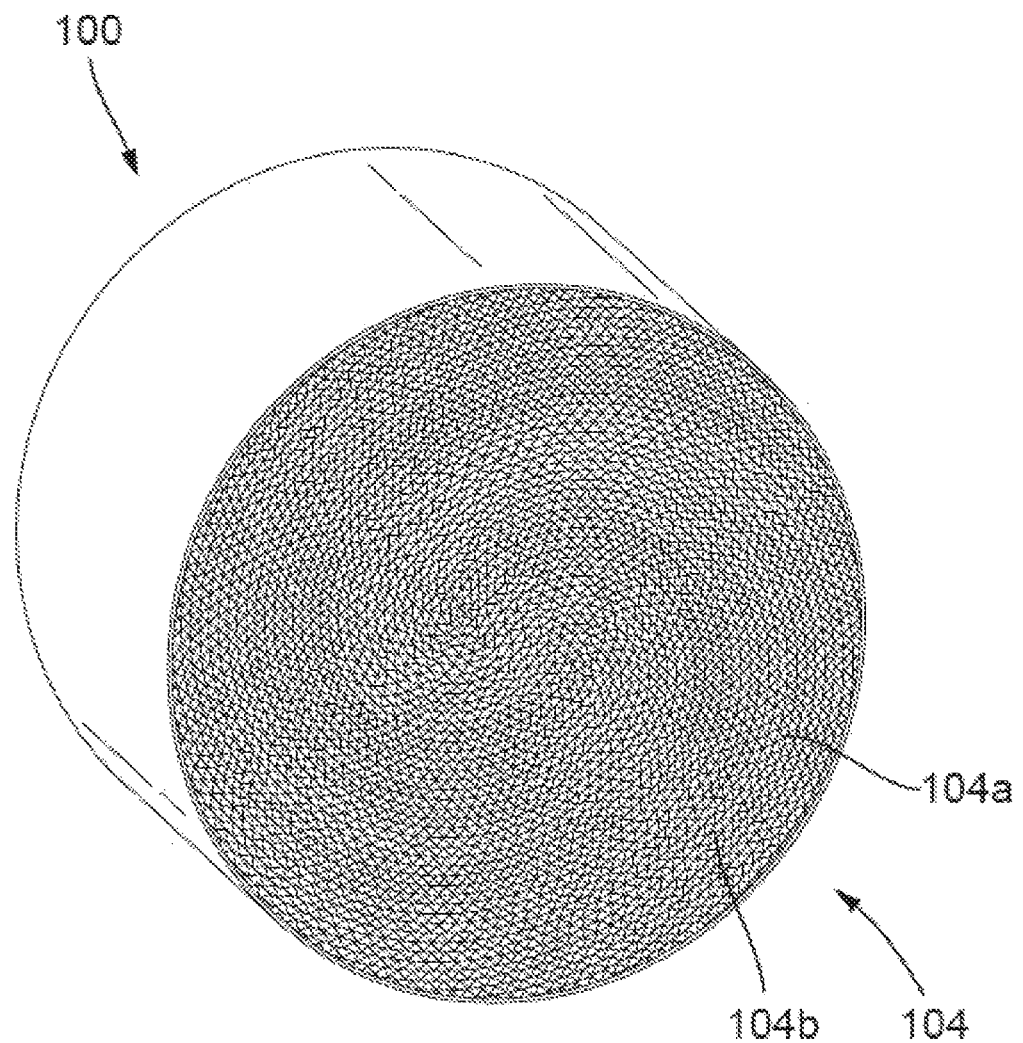
FIG. 4B is a perspective view of a recirculation treatment device according to another arrangement of the present disclosure.

In one or more arrangements of the present disclosure, the first, second, third and/or fourth, recirculation treatment devices 50, 52, 54, 56 may comprise the recirculation treatment device 100 depicted in FIGS. 4A and 4B. As shown in FIGS. 4A and 4B, the recirculation treatment device 100 may comprise a frame 102 and a substrate 104.

The substrate 104 may be a metallic substrate. Alternatively, the substrate may be a ceramic substrate. For example, the substrate may be a silicon carbide, cordierite, aluminum titanate and/or mullite substrate. The substrate 104 may be configured to support a catalyst 106 of the recirculation treatment device 100.

The frame 102 may be configured to provide a housing for the substrate 104. The substrate 104 may be coupled to the frame 102. For example, the substrate may be brazed or welded to the frame 102. Alternatively, the substrate 104 may be bonded to the frame 102 using and adhesive. Alternatively again, the frame 102 may substantially surround a periphery or perimeter of the substrate 104 and the substrate may be coupled to the frame 102 by an interference fit and/or the frame 102 may be configured to capture the substrate 104 within the housing of the frame 102.

The substrate 104 may be configured to define one or more channels 104a. For example, the substrate 104 may form a grid or mesh. The grid or mesh may comprise a plurality of elements 104b, such as wires, plates and/or fins, which define the one or more channels 104a. In the arrangement shown in FIG. 4A, the grid is a square grid defining a plurality of square channels 104a arranged in rows and columns which are perpendicular to each other. However, it is equally envisaged that the elements 104b of the grid shown in FIG. 4A may be arranged to form channels 104a shaped as triangles, rhombuses or any other polygons or combinations of different polygons. The grid may be a honeycomb grid. Alternatively, the channels 104a may not be arranged in a square grid with perpendicularly arranged rows and columns. For example, as shown in FIG. 4B, the channels 104a may be arranged in a circular spiral pattern.

Each of the one or more channels 104a of the substrate may be open at an inlet and outlet of the recirculation treatment device 100 to allow a flow of gases through the substrate 104.

The frame 102 may be configured to couple to the duct 23, 33, 42, in which the recirculation treatment device 100 is installed and may support the substrate 104 within the duct 23, 33, 42, such that substantially all of the gases flowing though the duct 23, 33, 42 pass through the substrate 104, e.g. through the one or more channels defined by the substrate.

In another arrangement (not shown), the recirculation treatment device may not comprise the frame 102, and/or the substrate 104 may be configured to couple directly to the duct 23, 33, 42. The substrate 104 may be configured to support the recirculation treatment device 100 within the duct.

The frame 102 and/or the substrate 104 may be configured, e.g. sized, such that substantially all the gases passing though the duct 23, 33, 42, in which the recirculation treatment device 100 is installed, may pass through the recirculation treatment device 100, e.g. through the channels of the substrate 104.

The recirculation treatment device 100 may further comprise the catalyst 106. The catalyst 106 may be configured to catalyze a reaction of one or more substances within the exhaust gases passing through the recirculation treatment device 100. For example, the catalyst may be configured to encourage oxidation and/or reduction of pollutant species within recirculated exhaust gases. The catalyst 106 may catalyze the reaction, to oxidise or reduce the polluting substances within the exhaust gases, when the temperature of the exhaust gases is at or above a light-off temperature of the catalyst. The catalyst may comprise a platinum group metal catalyst, such as a ruthenium, rhodium, palladium, osmium, iridium, and/or platinum catalyst. Additionally or alternatively, the catalyst may comprise a gold catalyst, a platinum-gold catalyst and/or a platinum-palladium-gold catalyst.

Additionally or alternatively, the catalyst 106 may be configured to capture or adsorb one or more substances from the exhaust gases passing through the recirculation treatment device 100, for example, the catalyst 106 may comprise a zeolite material.

The catalyst 106 may be provided within the channels 104a defined by the substrate 104. The catalyst 106 may be configured to at least partially cover, e.g. coat, the elements 104b defining the channels 104a of the substrate 104. In the arrangement shown in FIG. 4, the catalyst 106 is suspended in a wash coat which has been applied to the surfaces of the elements 104b, which form the walls, e.g. the internal walls, of the channels 104a. The wash coat may be configured to form a rough surface with a high surface area, such that the surface area of the catalyst 106 exposed to the exhaust gases is increased.

The recirculation treatment device 100 and the catalyst 104 may be configured to operate similarly to the exhaust treatment module 20, for example the catalyst provided within the recirculation treatment device 100 may be similar to the catalyst provided within a diesel oxidation catalyst recirculation treatment device. The recirculation treatment device 100 may be a diesel oxidation catalyst device.

Additionally or alternatively, the recirculation treatment device 100 and the catalyst 104 may be configured to perform similarly to the further exhaust treatment module 21, for example the recirculation treatment device may comprise a lean $NO_x$ trap or a Selective Catalytic Reduction (SCR) device.

In another arrangement, the recirculation treatment device 100 may comprise a catalyst configured to control the amount of ammonia and/or hydrogen sulphide within the exhaust gases. The recirculation treatment device 100 may be configured to use the ammonia as a reducing agent to reduce $NO_x$ compounds within the exhaust gases. For example, the catalyst 104 may be configured to catalyze the reduction reaction of the $NO_x$ with ammonia. The catalyst 104 may be an SCR catalyst. For example, the catalyst 104 may comprise a copper zeolite, iron zeolite, vanadium and/or tungsten titania, cerium and/or zirconium mixed oxides, and/or silver zeolite and/or mixed oxides. The recirculation treatment device may be an SCR device.

It is also envisaged that the recirculation treatment device 100 may comprise another form of exhaust gas after-treatment device. For example, the recirculation treatment device may comprise a reformer catalyst, configured to generate hydrogen gas within the recirculated exhaust gases. The presence of hydrogen within the recirculated gases may increase the temperature range over which the catalyst 104 within the recirculation treatment device 100, or another exhaust or recirculation treatment device within the engine assembly 2, is able to operate effectively to oxidize or reduce substances within the exhaust gases. Additionally or alternatively, the presence of hydrogen within the recirculated gases may improve the effect of regeneration of the recirculation treatment device 100, as described below.

In another arrangement the recirculation treatment device 100 may comprise a zeolite material configured to capture water vapor and/or liquid from the exhaust gases. Capturing water vapor and/or liquid from the recirculated gases may reduce the number and/or size of condensing water droplets within the recirculated gases, which impinge upon the compressor 14a or the HP compressor 14a'. Capturing water vapor and/or liquid may reduce wear and erosion of the compressor blades due to the impinging water droplets.

In any arrangement of the present disclosure, the recirculation treatment device may comprise support materials, such as alumina, titania, silica, silica/alumina, cerium/zirconium mixed oxides. The recirculation treatment device 100 may further comprise one or more promoters, including but not limited to lanthanum, cerium, praseodymium, neodymium, yttrium, magnesium and barium. The recirculation treatment device may comprise $NO_x$ storage materials, such as barium, cerium, magnesium, caesium, potassium and palladium-zeolite. The recirculation device, e.g. the catalyst, support material and/or other component of the recirculation device, may comprise other base metal mixed oxides, such as manganese, copper and/or iron.

By providing the first, second, third and/or fourth recirculation treatment devices 50, 52, 54, 56, polluting substances may be captured or removed from the exhaust gases before they reach the further exhaust treatment module 21. For example, a portion of the exhaust gases passing through the further exhaust treatment module 21 may already have passed through the first and/or second recirculation loops 22, 32. This may allow a greater proportion of the pollution substances to be removed from the exhaust gases before the exhaust gases are exhausted from the vehicle. This benefit may be particularly apparent in modern vehicles, which are configured to operate with reduced exhaust temperatures, which may reduce the efficiency of exhaust after-treatment devices.

Additionally, by providing the treatment devices upstream of the compressor 14a and HP compressor 14a', substances may be removed from the exhaust gases, which may otherwise be detrimental to the performance of the compressor 14a or HP compressor 14a', such as water vapor and/or liquid, as mentioned above.

During use of the recirculation treatment device 100, the material of the catalyst 106 may become oxidized, which may increase the light-off temperature and/or may reduce the efficacy of the catalyst 106. Additionally or alternatively, as the catalyst 106 adsorbs pollutant substances, and/or water vapor and/or liquid from the exhaust gases, the rate at which polluting substances, and/or water vapor and/or liquid is adsorbed may decrease. In order to reduce the light-off temperature of the catalyst and/or to refresh the catalyst such that it is able to adsorb polluting substances and/or water vapor from the exhaust at an increased rate. The recirculation treatment device 100 may be regenerated.

Additionally, during use of the recirculation treatment device 100 sulphur compounds, such as sulphur oxides ($SO_x$), may be captured by the catalyst 106. Captured $SO_x$ may be stored on the catalyst 106 and may reduce the rate at which the catalyst is able to adsorb other polluting substances from the exhaust gases and/or catalyze reactions of the exhaust gases. Stored $SO_x$ may also reduce the capacity of the recirculation treatment device 100 to store polluting substances, such as $NO_x$. Hence, regeneration may be required more frequently.

The table below details the different forms of recirculation treatment device 100, which may be provided within the engine assembly 2 shown in FIGS. 1, 2 and 3. The table details the functions of each of the different configuration of recirculation treatment device, e.g. comprising different types of catalyst. The table also provides an indication of the location at which it may be beneficial to provide each configuration of after treatment device. The locations are provided with reference to the arrangement shown in FIG. 1.

| Configuration of Device | Function | Location |
|---|---|---|
| Zeolite coating | Zeolite coating optimized for aqueous uptake and controlled release as vapor High surface area zeolite tuned for water absorption NH3 control NOx storage and conversion H2S control Debris/soot protection Condensate control | A or C post EGR cooler as this is where most condensate is formed. Location C where inlet air and cooled EGR gas mix causes the dew point for water to form. |
| DOC | HC/CO clean up NH3 oxidation H2S control HC storage Debris/soot protection Condensate control | B - Pre EGR cooler. Highest temperatures in EGR loop will be experienced. High temperature required for oxidation function |
| LNT | HC/CO clean up NOx storage and release NOx conversion HC storage Debris/soot protection Condensate control | B - Pre EGR cooler. Highest temperatures in EGR loop will be experienced. High temperature required for oxidation function |
| SCR | NOx storage and release NOx conversion HC storage NH3 control H2S control Debris/soot protection Condensate control | A, B or C depending on temperature window of application. |
| Reformer Catalyst | H2 Generation Condensate control | A, B or C depending on temperature window of application. |
| Catalyzed small monolithic high filtration efficiency substrate | Debris/soot protection HC/CO clean up NH3 control H2S control Condensate control | B - Pre EGR cooler. Highest temperatures in EGR loop will be experienced. High temperature required for oxidation function |

In order to regenerate the catalyst 106, the engine may be controlled to operate in a rich combustion mode. The presence of reducing species, such as unburnt hydrocarbons, in the exhaust gas may be increased. Additionally, the temperature of the exhaust gases may be increased.

Similar engine running conditions may also be used to perform a $DeSO_x$ procedure to remove the stored $SO_x$ from the catalyst 106. However, it may be necessary to operate with a further increased temperature in order to remove the stored $SO_x$.

The engine may also be run under similar conditions in order to regenerate the exhaust treatment modules 20. When each or both of the exhaust treatment modules 20, 21 is being regenerated, it may normally be desirable to ensure that the first and second exhaust recirculation valves 24, 34 are closed, in order to prevent the hot exhaust gases being recirculated. However, when the vehicle comprises the first, second, third and/or fourth recirculation treatment devices 50, 52, 54, 56, the first and/or second exhaust recirculation valves 24, 34 may be opened during rich and/or hot engine running to allow the recirculation treatment devices 50, 52, 54, 56 to be regenerated.

Regeneration of the first, second, third and/or fourth recirculation treatment devices 50, 52, 54, 56, and/or the exhaust treatment module 20 and/or the further exhaust treatment module 21, may be performed periodically. Additionally or alternatively, regeneration may be performed when it is determined that one or more of the devices requires regenerating. For example, if the light-off temperature of one or more catalysts of the recirculation treatment devices 50, 52, 54, 56 or the exhaust treatment modules 20, 21 has increased to a pre-determined level and/or if the rate of adsorption of a substance by one or more of the recirculation treatment devices or exhaust treatment modules have reduced below a desired level it may be determined that the device requires regenerating.

The first, second, third and/or fourth recirculation treatment devices 50, 52, 54, 56 may be regenerated at the same time as the exhaust treatment module 20 and/or the further exhaust treatment module 21. For example, the first and second recirculation valves 24, 34 may be opened each time the engine is operated under rich and/or hot combustion conditions. Alternatively, the first and second recirculation valves 24, 34 may only be opened during a period of rich and/or hot combustion if it is determined that one or more of the recirculation treatment devices require regeneration.

It will be appreciated that whenever the engine operates under rich and/or hot combustion conditions, the exhaust treatment module 20 and further exhaust treatment module 21 will be exposed to an increased amount of reducing species, such as unburnt hydrocarbons, and/or an increased temperature. Hence, it may be desirable to regenerate the first, second, third and/or fourth recirculation treatment devices when the exhaust treatment module 20 and/or further exhaust treatment module 21 requires regenerating. If the first, second, third and/or fourth recirculation treatment devices 50, 52, 54, 56 requires regeneration, the regeneration may be delayed until it is determined with the exhaust treatment module 20 and/or the further exhaust treatment module 21 requires regeneration.

FIGS. 1-4B show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example.

As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated by those skilled in the art that although the disclosure has been described by way of example, with reference to one or more exemplary examples, it is not limited to the disclosed examples and that alternative examples could be constructed without departing from the scope of the disclosure as defined by the appended claims.

The invention claimed is:

1. An exhaust gas recirculation system for an engine, the system comprising:
 an exhaust duct configured to receive and exhaust exhaust gases from the engine;
 an exhaust gas recirculation duct configured to recirculate a portion of the exhaust gases within the exhaust duct to the intake of the engine, wherein the exhaust gas recirculation duct comprises an inter-compressor duct configured to carry inlet and exhaust gases between first and second turbocharger compressors associated with the engine; and
 at least one recirculation treatment device provided in the inter-compressor duct, wherein the recirculation treatment device comprises a catalyst configured to encourage removal of contaminants from the recirculated exhaust gases.

2. The exhaust gas recirculation system according to claim 1, wherein the catalyst is configured to catalyze a reduction and/or oxidation reaction of the recirculated exhaust gases, wherein the catalyst is configured to capture a substance from the recirculated exhaust gases.

3. The exhaust gas recirculation system according to claim 1, wherein the catalyst is configured to capture water vapor and/or liquid from the recirculated exhaust gases.

4. The exhaust gas recirculation system according to claim 1, wherein the recirculation treatment device comprises a substrate, wherein the catalyst is provided on the substrate.

5. The exhaust gas recirculation system according to claim 1, wherein the system further comprises:
 a cooler configured to cool exhaust gases within the exhaust gas recirculation duct, wherein at least one of the recirculation treatment devices is provided upstream of the cooler.

6. The exhaust gas recirculation system according to claim 1, wherein the system further comprises:
 a cooler configured to cool exhaust gases within the exhaust gas recirculation duct, wherein at least one of the recirculation treatment devices is provided downstream of the cooler.

7. The exhaust gas recirculation system according to claim 1, wherein the recirculation treatment device comprises a diesel oxidation catalyst.

8. The exhaust gas recirculation system according to claim 1, wherein the recirculation treatment device comprises a lean NOx trap.

9. The exhaust gas recirculation system according to claim 1, wherein the catalyst comprises a platinum group metal catalyst.

10. The exhaust gas recirculation system according to claim 1, wherein the catalyst comprises a zeolite material.

11. The exhaust gas recirculation system according to claim 1, wherein the recirculation treatment device comprises a selective catalytic reduction device.

12. The exhaust gas recirculation system according to claim 1, wherein the recirculation treatment device comprises a reformer catalyst configured to generate hydrogen within the exhaust gases.

13. The exhaust gas recirculation system according to claim 1, wherein the exhaust gas recirculation duct comprises a low pressure exhaust gas recirculation duct, which branches from an exhaust pipe of the engine downstream of a turbocharger turbine associated with the engine, wherein the exhaust gas recirculation duct is configured to recirculate exhaust gases to a point upstream of a turbocharger compressor associated with the engine.

14. The exhaust gas recirculation system according to claim 1, wherein the exhaust gas recirculation duct comprises a high pressure exhaust gas recirculation duct, which branches from an exhaust pipe of the engine upstream of a turbocharger turbine associated with the engine, wherein the exhaust gas recirculation duct is configured to recirculate exhaust gases to a point downstream of a turbocharger compressor associated with the engine.

15. A method of operating an exhaust gas recirculation system, the system comprising:
 an exhaust duct configured to receive exhaust gases from the engine;
 an exhaust gas recirculation duct configured to recirculate a portion of the exhaust gases within the exhaust duct to the intake of the engine, the exhaust gas recirculation duct comprising an inter-compressor duct configured to carry inlet and exhaust gases between first and second turbocharger compressors associated with the engine; and at least one recirculation treatment device provided in the inter-compressor duct, wherein the recirculation treatment device comprises a catalyst configured to encourage removal of contaminants from the recirculated exhaust gases;

wherein the method comprises:

catalyzing reactions of the exhaust gases within the exhaust gas recirculation duct.

16. The method according to claim 15, wherein the method further comprises operating the engine under rich and/or hot combustion conditions.

17. The method according to claim 15, wherein the system further comprises a valve configured to control the flow of exhaust gases through the exhaust gas recirculation duct, the method further comprising:

controlling the valve to allow a flow of exhaust gases through the duct.

18. The method according to claim 15, wherein the method further comprises:

determining whether one or more of the recirculation treatment devices require regenerating.

19. The method according to claim 16, wherein the system further comprises an exhaust after-treatment module provided in the exhaust duct, the method further comprising:

determining whether the exhaust after-treatment module requires regenerating.

20. The method according to claim 19, wherein operating the engine under rich and/or hot combustion conditions is delayed until the exhaust after-treatment module requires regenerating.

* * * * *